United States Patent [19]
Lewis et al.

[11] 3,977,630
[45] Aug. 31, 1976

[54] STOL AIRCRAFT

[75] Inventors: Delbert S. Lewis; David A. Norton, both of Bellevue; Robert P. Person, Mercer Island; George S. Schairer, Bellevue; John K. Wimpress, Seattle, all of Wash.

[73] Assignee: The Boeing Company, Seattle, Wash.

[22] Filed: Nov. 4, 1974

[21] Appl. No.: 520,674

Related U.S. Application Data

[63] Continuation of Ser. No. 339,734, March 9, 1973, abandoned.

[52] U.S. Cl. .............................................. 244/43 DB
[51] Int. Cl.² ............................................. B64C 21/08
[58] Field of Search ........ 244/42 D, 42 DA, 42 DB, 244/42 CA, 42 CB, 110 B, 15

[56] References Cited
UNITED STATES PATENTS

| | | | |
|---|---|---|---|
| 1,422,616 | 7/1922 | Page | 244/42 DB |
| 2,120,568 | 6/1938 | Nazir | 244/42 DB |
| 2,991,961 | 7/1961 | Rogallo et al. | 244/15 X |
| 3,018,983 | 1/1962 | Davidson | 244/15 |
| 3,112,089 | 11/1963 | Dornier | 244/42 DB |
| 3,126,173 | 3/1964 | Alvarez-Calderon | 244/42 DB |
| 3,583,660 | 6/1971 | Hurkamp et al. | 244/42 DA |
| 3,604,662 | 9/1971 | Nelson et al. | 244/110 B X |
| 3,837,601 | 9/1974 | Cole | 244/42 DB |

*Primary Examiner*—Trygve M. Blix
*Assistant Examiner*—Barry L. Kelmachter
*Attorney, Agent, or Firm*—Christensen, O'Connor, Garrison & Havelka

[57] ABSTRACT

A STOL aircraft has high mounted left and right wings, each of which defines an upper airfoil surface. A mixed flow turbofan engine is mounted on each wing such that the exhaust nozzle of the engine is positioned adjacent but rearwardly of the leading edge of the wing and such that in a cruise mode of operation the exhaust stream exits from the nozzle substantially chordwise across the airfoil surface. A set of trailing edge flaps is located on each wing aft of the exhaust nozzle. When the flaps are extended, spanwise slots are formed by separation of flap segments from the wing and from each other. The flaps include closure apparatus for closing off the slots during STOL operation so that the flaps, closure apparatus and rear portion of the upper airfoil surface form a smooth downwardly curved surface aft of the engine. The slot closure devices can be retracted to allow the flaps to operate as conventional aerodynamic slotted flaps in case of engine failure. Each engine also includes thrust reversing apparatus for braking and backing of the airplane, which apparatus deflects the engine exhaust stream upwardly and forwardly with respect to the longitudinal axis of the aircraft.

18 Claims, 12 Drawing Figures

Fig. 3A
CRUISE

Fig. 3B
STOL

Fig. 3C
ENGINE-OUT

Fig. 3D
REVERSE

Fig. 6

Fig. 7 CHANGE IN LONGITUDINAL FORCE(%)

Fig. 4

STOL AIRCRAFT

BACKGROUND OF THE INVENTION

This is a continuing application based on a prior copending application, Ser. No. 339,734, filed Mar. 9, 1973, now abandoned, the benefit of the filing date of which is hereby claimed under 35 U.S.C. 120.

This invention relates to short take-off and landing (STOL) aircraft and more particularly to a configuration of engines, wings and trailing edge flaps on a STOL aircraft that provides diverse operational modes and a means for controlling aircraft speed and glide path upon approach to landing.

Conventional aircraft rely on aerodynamic lift derived from wing and/or body airfoil structure to counteract gravity and thus provide the capability of flying through the air. Aerodynamic lift is dependent on, among other things, the shape of the airfoil, the size of the airfoil and the speed of the airstream across the airfoil. These design parameters vary depending upon the end use of the particular aircraft. Thus, a high-speed aircraft will require little wing area in order to maintain level flight at high speeds. However, such an aircraft generally requires large distances for take-off and landing. Conversely, an aircraft with a light wing loading can be designed to take-off and land in relatively short distances, but has limited speed capabilities. A family of aircraft generally referred to as short take-off and landing (STOL) aircraft have been developed in an attempt to fulfill the need for an aircraft which has a relatively high speed capability, but which can take off and land in relatively short distances. Generally, STOL aircraft utilize powered lift, i.e., the augmentation of aerodynamic lift by an engine thrust component.

One particular method of augmenting aerodynamic lift with a jet engine is disclosed in U.S. Pat. No. 3,614,028, using the principle commonly referred to as externally blown flaps. In this system, a jet engine is mounted below the wing and is utilized in combination with a set of trailing edge flaps to divert thrust downwardly. Aerodynamic lift is also supplemented through the use of spanwise slots in the flaps. Although this approach is workable, it has several disadvantages. Among these are widely separated, pod-mounted engines, complex thrust reversing mechanisms, large power requirements, heat resistant flap structures, and limited capability to land on unimproved fields.

Another method for augmenting aerodynamic lift is by diverting thrust downwardly across trailing edge flaps utilizing the Coanda effect. A configuration for employing this method is disclosed in U.S. Pat. No. 3,018,983. This method of augmenting aerodynamic lift is referred to herein as upper surface blowing. Although the disclosure of the U.S. Pat. No. 3,018,983 sets forth the general principle of upper surface blowing, it does not disclose a feasible configuration by which upper surface blowing can be applied to an operational STOL aircraft. It has been found that the exhaust stream does not efficiently attach, and in some cases does not attach at all, to a trailing edge flap configured as shown in the above-mentioned patent. The type of flap disclosed in this patent does not lend itself to an aircraft which has the flexibility of operating in a STOL mode, a cruise mode, and an emergency or engine-out mode.

When attempting a slow, steep descent with a STOL aircraft, only a small amount of longitudinal thrust is required, while a large normal thrust component is desired to maintain maximum lift. To increase the angle of descent it is most desirable to decrease the longitudinal component of thrust while maintaining the normal thrust component substantially the same. In conventional aircraft the longitudinal thrust component is conventionally controlled by throttle movements, thereby increasing or decreasing the available thrust from the engine. This method becomes marginally workable when employing upper surface blowing to augment aerodynamic lift, since both the longitudinal and normal thrust components are varied when engine power is increased or decreased. Thus, a method for controlling longitudinal thrust without significantly affecting the normal thrust component is desirable.

Furthermore, response time in a system for longitudinal thrust control must be maintained at a minimum level so that corrections to the glide path can be achieved quickly. It is well known that jet engine response in many instances is too slow to rely totally upon variations in jet engine thrust to maintain a predetermined glide path. Thus, a method for controlling longitudinal thrust on a STOL aircraft that can effect almost immediate longitudinal thrust changes is most desirable.

A broad object of the present invention is to provide a STOL aircraft having a unique engine, wing and trailing edge flap configuration and actuating mechanism that provides the capability of precisely controlling glide path while maintaining the engine power at a relatively high and constant level. A broad object of the present invention is to provide a STOL aircraft configuration that uses upper surface blowing in conjunction with a trailing edge flap arrangement that can efficiently and effectively operate (a) in a STOL configuration wherein glide path can be precisely controlled, (b) in a cruise mode similar to that of a conventional aircraft, (c) in an engine-out mode wherein the flap configuration can be altered to provide aerodynamic lift, and (d) in a thrust reversing mode that provides efficient braking and backing capabilities. Other objects of the present invention are to provide: an engine-airfoil configuration which can operate in the cruise mode without the necessity for exhaust diverting flaps or doors to separate the engine exhaust from the wing surface; an engine-airfoil-trailing edge flap configuration that operates efficiently to turn the exhaust stream in a downward direction through the utilization of the Coanda effect, while creating a sufficient distortion of air flow over the wing thereby creating supercirculation to supplement the aerodynamic lift normally provided by movement of ambient air over the airfoil; an engine-wing-trailing edge flap configuration that diverts the thrust from the engine through the movement of the trailing edge flaps to a lowered or extended position without the use of movable thrust deflector doors and the like; a STOL aircraft that can generate maximum lifting forces in a low-speed configuration using the wing and vectored thrust without unduly penalizing cruise speed efficiency; a trailing edge flap configuration with a sufficiently large upper radius of curvature to gradually turn engine trust downwardly over the upper flap surfaces thereby avoiding an abrupt change in flow direction of the thrust gases; means for providing slots in the trailing edge flap system to facilitate ambient air flow therethrough in an engine-out condition; a jet engine exhaust nozzle with a width-to-height ratio (aspect ratio) which will efficiently direct and spread the exhaust stream across the upper airfoil surface; an engine nozzle location that effectively reduces engine noise transmitted to the ground; an engine location sufficiently high relative to the ground so that ingestion of foreign objects is minimized thereby facilitating operation from unimproved fields; an engine placement that permits thrust reversing designs for deflecting thrust gases upwardly and laterally to avoid re-ingestion by the engine inlet, to avoid hot gas impingement on the airplane structure, and to avoid stirring up of ground debris and dirt on unimproved fields; an engine thrust reversing configuration which will enhance braking by providing a downward thrust component thereby providing better frictional contact between the wheels and the landing field; a thrust reversing configuration which can be utilized down to zero ground speeds and for backing up.

SUMMARY OF THE INVENTION

In accord with foregoing objects, and other objects that will be apparent to one of ordinary skill in the art upon reading the following description of the preferred embodiment, the present invention provides a wing, engine and flap configuration for use in an aircraft. The wing includes an upper airfoil surface. An engine is associated with the wing and is suitable for generating a lift enhancing exhaust stream when the exhaust stream is directed downwardly. The engine includes an exhaust nozzle from which the exhaust stream exits. The exhaust nozzle is mounted in relationship to said wing so as to direct said exhaust stream along a path that extends rearwardly across the upper airfoil surface of the wing. A flap is fixed to the wing at a location aft thereof. The flap is movable between a retracted position and extended positions wherein it is positioned rearwardly and downwardly relative to the upper airfoil surface. When the flap is extended, the flap and the wing cooperate to define a longitudinal spanwise slot in the upper airfoil surface. The width of the slot varies in accordance with the relative extension of the flap from the retracted position. A flap actuating means is associated with the flap for moving said flap between said retracted position and said extended positions. A slot closure means is associated with the wing and the flap for closing the longitudinal spanwise slot in the upper airfoil surface. The slot closure means comprises a slot closure device and an activating means therefor. The slot closure device is movable between a closed position and an open position. In the closed position, the longitudinal spanwise slot in said upper airfoil surface is closed to maintain a smooth upper airfoil surface configured so as to cause attachment of the exhaust stream to the upper airfoil surface and to turn the attached exhaust stream downwardly along said upper airfoil surface to create a longitudinal thrust component and a normal thrust component. In the open position, the slot closure device opens the longitudinal spanwise slot to allow ambient air to pass therethrough to enhance aerodynamic lift. The actuating means for the slot closure device moves the slot closure device between the open and the closed positions.

Another aspect of the present invention provides a method for controlling the drag and lift components acting on an aircraft in which an exhaust stream from an engine is directed over an upper airfoil surface of a wing and trailing edge flap. The trailing edge flap is located on the aft end of said wing and is selectively extendable from a retracted cruise position to a plurality of extended positions such that the angle that the chordline defined by the flap makes with the chordline defined by the wing can be varied. The trailing edge flap has an upper curved surface so configured and arranged as to form, when extended, a surface to which the exhaust stream can adhere, thereby being turned downwardly and rearwardly to create both longitudinal and normal thrust components. The method broadly comprises the steps of (a) extending the trailing edge flap so as to create a slot between the wing and the trailing edge flap, to allow ambient air to flow between the wing and the trailing edge flap when said slot is open and to prevent such flow when the slot is closed; and (b) controlling the opening and closing of said slot without moving the trailing edge flap in a manner such that (1) when the slot is closed, a smooth continuous curved surface, which extends downwardly and rearwardly from said upper airfoil surface of the wing and to which the exhaust stream can adhere and turn about is formed, and (2) when the slot is opened, the smooth continuous curved surface becomes discontinuous to allow ambient airflow through the slot.

BRIEF DESCRIPTION OF THE DRAWINGS

A better understanding of the present invention can be acquired by reading the ensuing specification in conjunction with the accompanying drawings wherein.

DESCRIPTION OF PREFERRED EMBODIMENT

Figure 1:
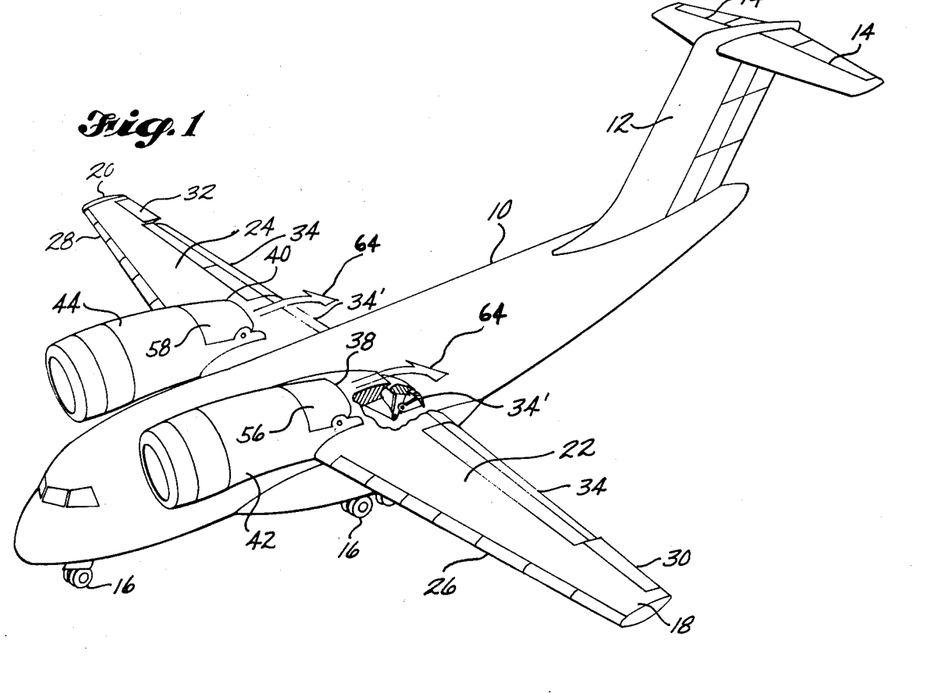
FIG. 1 is an isometric view of an aircraft employing the preferred embodiment of the engine, wing and flap configuration of the present invention, a portion of the left wing and inboard flaps being broken away for clarity.

Referring first to FIG. 1, the aircraft includes a fuselage 10 having a vertical stabilizer 12 and a horizontal stabilizer 14 connected to its aft end. Appropriate landing gears 16, preferably of the retractable type, are suitably mounted on the lower portion of the fuselage 10. Left and right wings 18 and 20, respectively, are mounted high on the fuselage 10 and define upper airfoil surfaces 22 and 24. Leading edge flaps may be mounted on the leading edges 26 and 28 of the wings 18 and 20, respectively. Conventional ailerons 30 and 32, outboard trailing edge flaps 34 and inboard trailing edge flaps 34' are mounted on the wings 18 and 20. It is understood that the outboard trailing edge flaps 34 are utilized in a conventional manner to increase camber and chord of the wings 18 and 20 in order to supplement conventional aerodynamic lift during approach and take-off. In cruise operation, the flaps 34 and 34' are retracted into the wing to form the trailing portion of the wing.

The engines 42 and 44 are mounted on the wings 18 and 20 by structural members (not shown) so that a substantial portion of the engines are located ahead of and above the leading edges 26 and 28. The engines in the presently preferred embodiment are mixed-flow turbofan engines. However, a variety of propulsion sources can be used to provide an exhaust stream that exits from a nozzle across an upper airfoil surface, for example, a turbojet engine or a ducted fan driven by a reciprocating engine can be employed. The openings of the engine exhaust nozzles 38 and 40 are preferably located in the forward half, chordwise, of the wings 18 and 20. The exhaust stream is directed by the nozzles 38 and 40 chordwise across the upper airfoil surfaces 22 and 24. This arrangement of the engines relative to the wings, causing the exhaust stream to flow across the upper airfoil surface, is referred to as upper surface blowing. In conventional flight, i.e., the cruise mode of operation, the exhaust streams from the engines 42 and 44 issue rearwardly (as shown by dashed line arrow 46 in FIG. 2) to provide forward longitudinal thrust. When the aircraft is operating in the cruise mode, substantially all lift is derived from conventional aerodynamic lift provided by the wings 18 and 20.

The inboard trailing edge flaps 34' are nearest the roots of the wings 18 and 20 and are located directly behind the exhaust nozzles 38 and 40 of turbofan engines 42 and 44. The inboard trailing edge flaps 34' are shown in cut-away view on left wing 18 in an extended position. In this position the exhaust streams, issuing chordwise across the upper airfoil surfaces 22 and 24 from exhaust nozzles 38 and 40, are caused to adhere to the upper surfaces of the inboard trailing edge flaps 34' by the Coanda effect, as indicated by arrow 64. The exhaust streams are thereby turned downwardly while still flowing rearwardly to yield both a longitudinal thrust component and a normal thrust component, as will be described in more detail later.

For purposes of discussion herein, the thrust provided by the engines 42 and 44 will be defined in terms of a longitudinal component and a normal component. The longitudinal component is the vector component of the thrust that lies parallel to the airplane reference axis, sometimes referred to as the longitudinal axis of the aircraft. The normal component of thrust is that vector component of thrust that lies perpendicularly to the longitudinal axis of the aircraft. When the net longitudinal thrust component is rearwardly directed, the thrust is referred to as being reversed.

Figure 2:
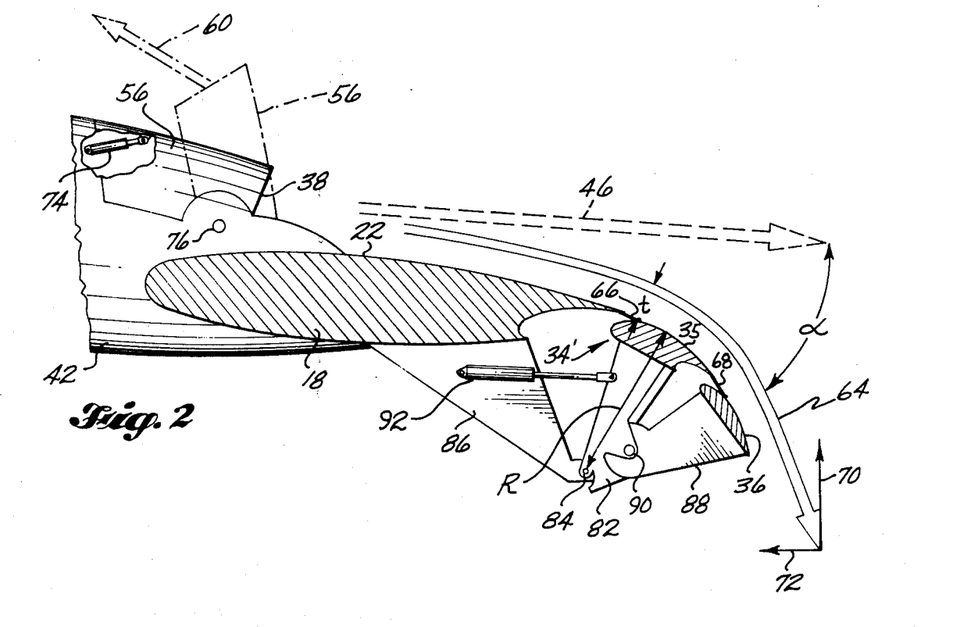
FIG. 2 is an enlarged partial sectional view in elevation of the engine, wing and flap configuration.

Referring now to FIG. 2, the left wing 18 and engine 42 are illustrated as being representative of the configuration on both the left and right wings. The trailing edge flaps 34' are shown in an extended position for STOL mode operation. For purposes of illustration the flaps 34' are shown in two segments, but of course, one segment or more than two segments can be utilized in conjunction with the present invention. The main segment 35 of the trailing edge flaps 34' is connected to arm 82, which pivots about pin 84 on mounting arm 86, in turn connected to and extending downwardly from the bottom of wing 18. The aft flap segment 36 is mounted on arm 88, which is mounted for swinging movement about pin 90 in turn connected to the main segment support arm 82.

As explained above, in the STOL mode of operation, the flaps 34' are extended so that the exhaust stream adheres to the upper airfoil surface 22, including the upper surface of the flaps, by means of the Coanda effect. Thus, the exhaust stream is diverted or vectored downwardly in the direction of arrow 64. The thrust derived from the exhaust stream can be resolved into a longitudinal thrust component 72 and a normal lift component 70 perpendicular to the longitudinal component 72. In the STOL mode of operation, spanwise slots, formed between the flap segments and the main segment and the wing, are covered by closure devices 66 and 68 described in more detail below. When the flaps 34' are in an extended position, ambient air traveling over the upper airfoil surface provides conventional aerodynamic lift. In addition, the conventional aerodynamic lift is supplemented by a phenomenon known as supercirculation. Supercirculation is the distortion of the aerodynamic flow over the airfoil caused by a gas stream issuing chordwise from a flap trailing edge. Since the vectored thrust, represented by arrow 64, exits chordwise from the aft flap segment 36, supercirculation across the wing 18 is created, thus supplementing the overall lift derived from the engine, wing and flap configuration of the present invention.

In the disclosed embodiment of the invention a turbofan engine having a by-pass ratio on the order of 4.0 or larger is preferred. The exhaust nozzle is so designed that the exhaust stream is deflected slightly downwardly and across the upper airfoil surface 22. It is presently preferred that the exhaust stream impinge upon the upper airfoil surface 22 at an angle of about 10° with respect to the wing chord. The opening of the exhaust nozzle 38 is designed to have an aspect ratio on the order of about 2 to about 6. The aspect ratio is defined as the average width divided by the average height of the nozzle opening. This exhaust nozzle opening will cause the exhaust stream to spread laterally or spanwise as it moves rearwardly over the upper airfoil surface 22.

The foregoing engine parameters, as well as the momentum of the exhaust stream, define the height or thickness of the exhaust stream ($t$) as it approaches the extended flaps 34'. It has been found that in order to effectively cause the exhaust stream to adhere to and turn downwardly over the flaps 34', the ratio ($R/t$) of the average radius ($R$) of curvature of the curved surface formed by the flap segments 35 and 36 to the thickness ($t$) of the exhaust stream must be at least about 2.0 or greater. If $R/t$ is less than about 2.0, the exhaust stream will separate from the upper surface of the flaps, thus reducing or eliminating the desired normal thrust component 70.

After an aircraft employing the engine, wing and flap configuration of the present invention has touched down on a landing field, the inverted U-shaped panels 56, which form the upper portion of exhaust nozzles 38 (and the panel 58 forming part of exhaust nozzle 40 on the right engine 44 shown in FIG. 1) can be rotated to the position shown in dot-dash outline in FIG. 2 to block the rearward flow of the exhaust stream and divert it forwardly and upwardly with respect to the longitudinal axis of the aircraft. The deflector panel 56 of exhaust nozzle 38 is pivoted by an actuator 74, such as a pneumatic or hydraulic cylinder, about pins 76 to the rearward exhaust reversing position. The exhaust stream is deflected by panel 56 in the direction of arrow 60 to provide a forwardly and upwardly directed exhaust stream to brake the airplane on landing or to back up the airplane on the ground. Specific exhaust reversing structure for an aircraft of the type disclosed herein is shown and described in a copending application in the names of L. Kimes and C. Kahler and assigned to the assignee hereof, Ser. No. 339,725, filed Mar. 9, 1973, now U.S. Pat. No. 3,874,620.

Figure 3A:
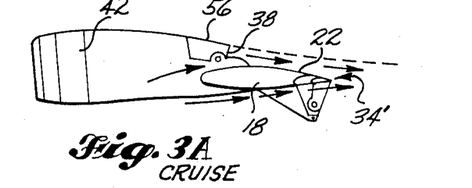
FIGS. 3A, 3B, 3C and 3D are pictorial views showing the four modes of operation of the engine, wing, and trailing edge flap configuration of the present invention.

FIGS. 3A through 3D, inclusive, illustrate pictorially the four operational modes of the engine, wing and trailing edge flap configuration of the present invention. FIG. 3A illustrates the cruise mode of the configuration. Thrust reverser panel 56 is in a cruise position forming the upper portion of the exhaust nozzle 38 of the engine 42. The inboard trailing edge flaps 34' are also in their retracted position. Thus the exhaust stream from the engine 42 exits rearwardly providing an almost horizontal, substantially longitudinal thrust component. The normal airflow over the upper airfoil surface 22 of wing 18 functions conventionally to provide conventional aerodynamic lift while airflow under the wing 18 passes smoothly rearwardly of the wing.

Figure 3B:
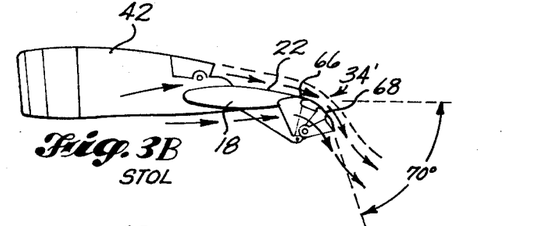

FIG. 3B illustrates the present invention in STOL configuration wherein the flaps 34' are in an extended position with the slot closing devices 66 and 68 closing the spanwise slots formed by the extended flaps. The exhaust stream from the engine 42 travels rearwardly over the airfoil surface 22 and is diverted downwardly by the Coanda effect to provide both a normal thrust component and a longitudinal thrust component.

Figure 3C:
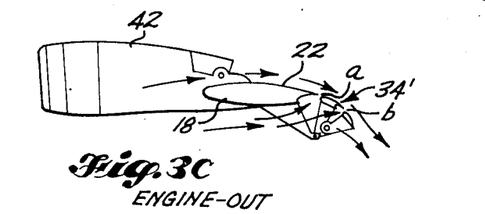

FIG. 3C illustrates the present invention in the emergency engine-out configuration wherein the engine 42 has failed and is not providing any thrust. In this configuration, the slots "a" and "b" are opened by removing the slot closing devices 66 and 68 from the spanwise slots formed by the extended trailing edge flaps 34', as discussed in detail below. The flaps 34' are thus transformed into a more conventional slotted flap arrangement which increases the aerodynamic lift obtained only by ambient airflow over the airfoil surface 22 and flaps 34'.

Figure 3D:
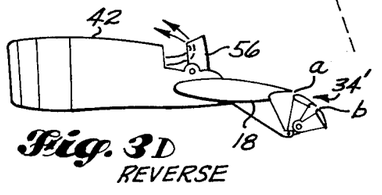

FIG. 3D illustrates the configuration of the present invention in a thrust reversing mode. The reversing panel 56 is pivoted rearwardly to divert the thrust forwardly and upwardly. Thus, the thrust derived from engine 42 can be used to brake the aircraft or to back the aircraft on the ground. The slots "a" and "b" can either be opened or closed since they are nonfunctional in this mode of operation.

Figure 4:
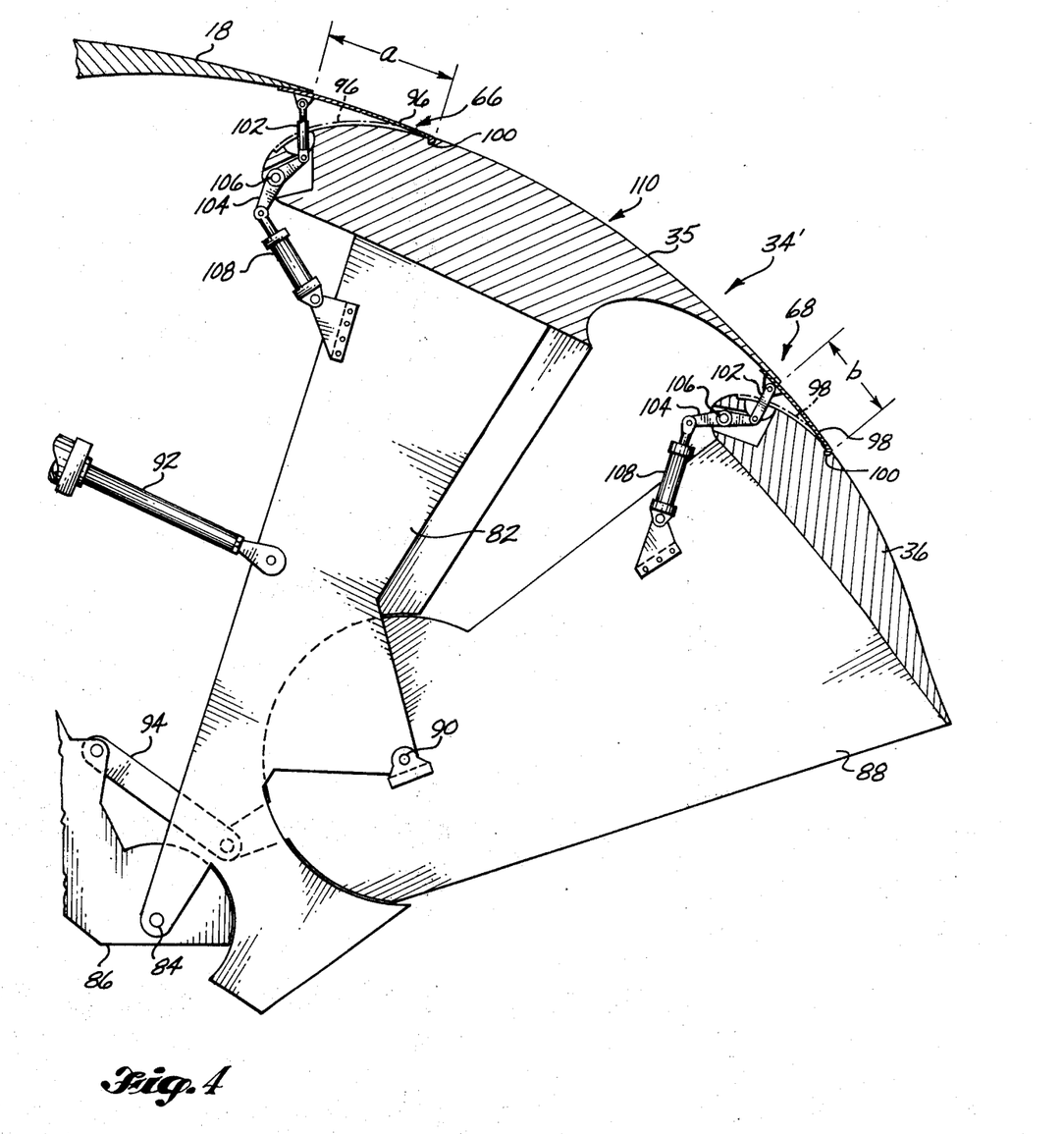
FIG. 4 is an enlarged elevation view in partial section of a trailing edge flap structure that can be used with the present invention.

Referring now to the detailed view of FIG. 4, the trailing edge flaps 34' are shown in an extended position. The support arm 88 for the aft flap segment 36 and the support arm 82 for the main flap segment 35 are extended by a quick-acting actuator 92, such as a hydraulic cylinder. A link 94, connected to the mounting arm 86 and to the support arm 88 for the aft segment 36, causes the arm 88 to pivot about pin 90 and to move rearwardly of the support arm 82 as the latter pivots about pin 84. When the flaps 34' are in an extended position, openings or slots "a" and "b" are formed respectively, between the rear edge of wing 18 and the forward portion of main flap segment 35 and the rear edge of main flap segment 35 and the forward portion of aft flap segment 36.

Slot closure devices, generally designated 66 and 68, are mounted on the forward portions of flap segments 35 and 36 to close the slots "a" and "b" when the aircraft is functioning in a STOL mode. The slot closure devices 66 and 68 are formed by flexible sheets 96 and 98 extending chordwise and spanwise across slots "a" and "b". The rear ends of the flexible panels 96 and 98 are connected to the flap segments 35 and 36 at points 100 by suitable fastening means. Flanges on the bottom side of the flexible panels 96 and 98 are pivotally connected to links 102. Links 102 extend downwardly and in turn are connected to bell cranks 104 pivotally mounted on the forward edge of the flap segments 35 and 36 by pins 106. Quick acting actuators 108 are connected to the bell cranks 104 at one end and respectively to support arms 82 and 88 at their other ends. The actuators 108 are preferably pneumatic cylinders which are spring biased to hold the slot closure devices 66 and 68 in an open position. Bleed air from the aircraft engines, fed to the actuators 108 by conduits (not shown), can be used to power the actuators 108 to move the devices 66 and 68 to a closed position. The slot closing panels 96 and 98 are normally in the positions illustrated when the flaps are extended in a powered STOL configuration. Thus, a smooth arcuate surface generally designated 110 is formed from the rear portion of the wing 18 down to the trailing edge of the aft flap segment 36. This arcuate surface facilitates attachment of the exhaust streams from the engines to the wing and flap structures to divert the thrust downwardly as explained above.

The inboard flaps 34' rearward of the engines can be made to operate in the manner of conventional slotted flaps by stopping the flow of bleed air to the actuators 108, thereby allowing the spring biased actuators 108 to move the links 102 and bell cranks 104 and retract the flexible panels 96 and 98 to a nested position in recesses provided in the leading edges of the flap segments 35 and 36, as shown by the dot-dash outlines. When the panels 96 and 98 are in the nested position, the spanwise slots "a" and "b" in the flaps 34' are open. This mode of operation with the inboard flaps 34' would not normally be employed except in an emergency situation such as failure of one of the engines. Upon engine failure the lift derived from the diverted exhaust stream would be destroyed. Additionally, some of the aerodynamic lift normally present would also be lost due to the large uninterrupted nature of the upper airfoil surface created by the closed slots. This normal aerodynamic lift is completely recovered by opening the slots "a" and "b" between the flaps 34' to allow them to operate in a conventional manner. The slot closure devices described above are more completely shown and described in a copending application in the name of J. Cole, Ser. No. 339,645, now U.S. Pat. No. 3,837,601, filed Mar. 9, 1973 and assigned to the assignee hereof.

Means other than the slot closure devices can be employed to assure attachment of the exhaust stream to the trailing edge flaps when extended. For example, if the lower portion of the exhaust stream leaving the trailing portion of the wing 18 is made to impinge upon the leading edge of the main flap segment 35, the exhaust stream will adhere to the main flap segment. Likewise, if the exhaust stream leaving the trailing portion of the main flap segment is made to impinge upon the leading edge of the aft flap segment, the exhaust stream will adhere to the aft flap segment. A flap arrangement employing the foregoing technique for insuring attachment of the exhaust stream to the flaps is shown and described in the copending application in the name of J. Cole, filed concurrently with the parent application hereof and assigned to the assignee hereof, Ser. No. 339,640, now U.S. Pat. No. 3,870,252.

Figures 5A, 5B, 5C:
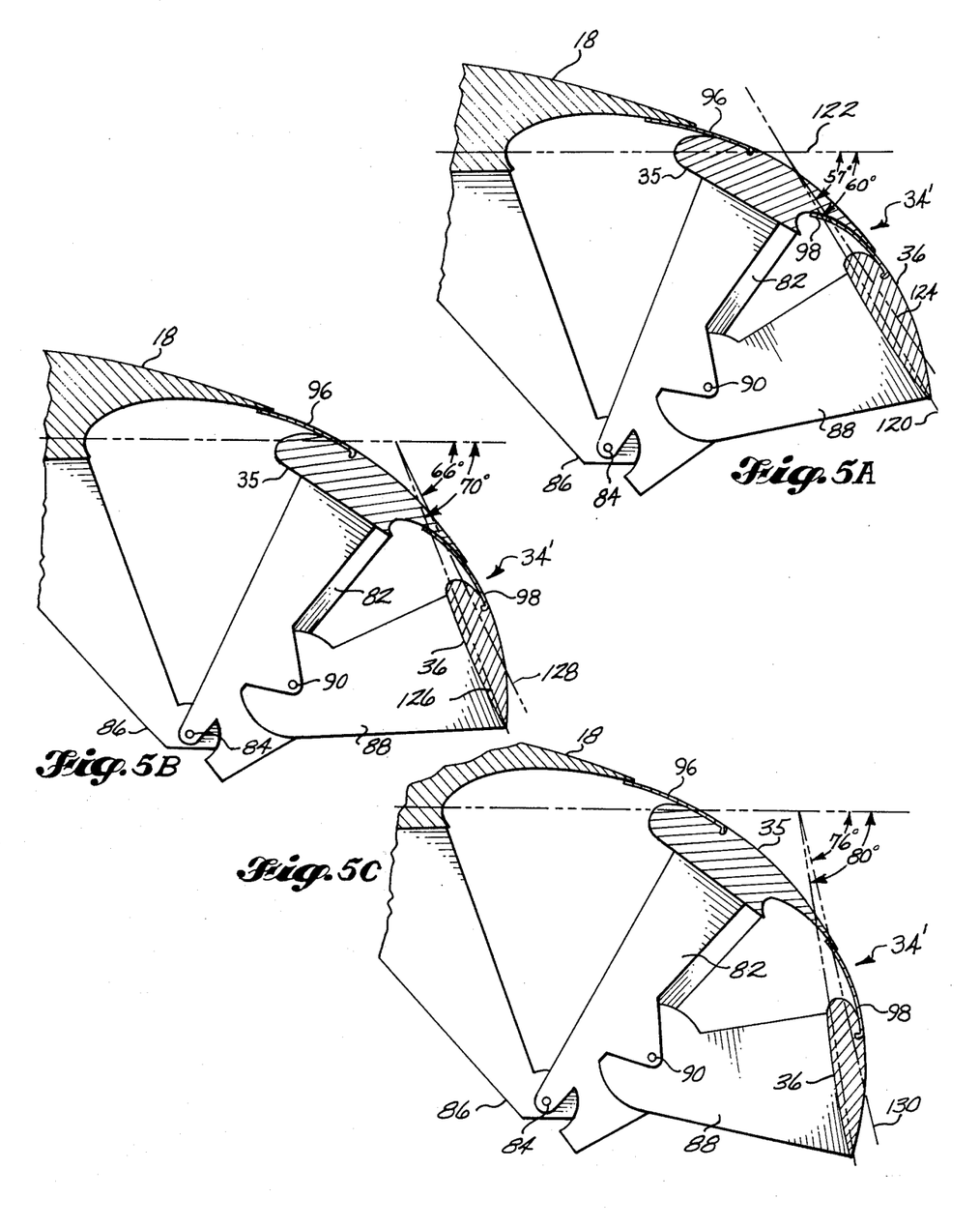
FIGS. 5A, 5B and 5C are pictorial views showing various trailing edge flap settings ranging from 60° to 68°.

One of the primary advantages of the flap configuration of the present invention is that the magnitude of the longitudinal thrust component of the vectored exhaust stream can be controlled by movement of the flap segments. Control of the magnitude of the longitudinal thrust component becomes very important in maintaining a predetermined glide path on approach to a landing field. In FIGS. 5A, 5B and 5C three (3) flap settings are shown to illustrate the manner in which the magnitude of the longitudinal thrust component can be varied while still maintaining substantially all of the direct lift derived from the normal thrust component.

In FIG. 5A the main flap segment 35 and the aft flap segment 36 are positioned so that the chord line 120 through the aft flap segment 36 makes an angle of 60° with the chord line 122 of the wing 18. The chord line 120 through flap segment 36 is coincident with the true chord line 122 of the wing 18 when the flaps are in a retracted position. The chord line 120 is used for reference purposes to identify different flap setting angles. This setting of the trailing edge flaps 34' will vector or turn the thrust to an angle of 57° with respect to the chord line 122, as shown by dashed line 124. The exhaust stream is not turned completely through the angle of 60° due to small dynamic turning losses and because the exhaust stream tends to become thicker near the trailing edge of the aft flap 36, reducing the capability of the upper airfoil surface to turn the exhaust stream as described above.

In FIG. 5B the chord line 126 through the aft flap segment 36 forms an angle of 70° with the chord line 122 of the wing 18. In this position the exhaust stream is diverted through an angle of approximately 66° as shown by dashed line 128. In FIG. 5C the aft flap segment is set to an angle of 80°. At this flap setting, the exhaust stream is diverted through an angle of approximately 76° as indicated by dashed line 130.

Figures 6, 7:
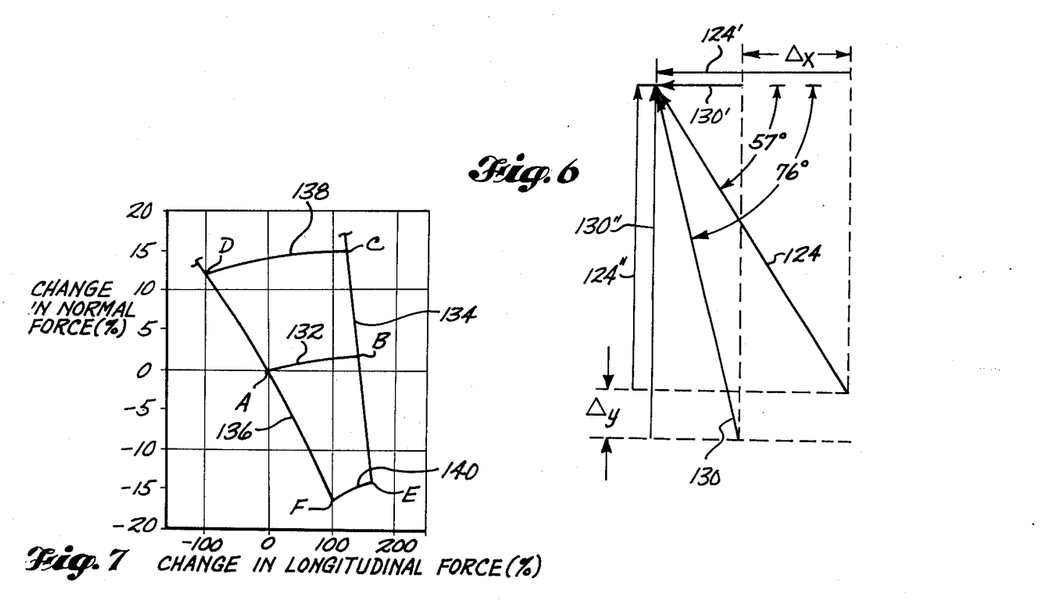
FIG. 6 is a vector diagram comparing longitudinal and normal thrust components for the flap settings shown in FIGS. 5A and 5C.
FIG. 7 is a graph illustrating the change in longitudinal forces on an aircraft versus the change in forces normal to the longitudinal forces for the flap settings shown in FIGS. 5A and 5C.

FIG. 6 illustrates the resulting thrust vectors 124 and 130 obtained by varying the flap setting from 60° (as shown in FIG. 5A) to the flap setting of 80° (as shown in FIG. 5C). Thrust vector 124, corresponding to the diverted exhaust stream as shown in FIG. 5A, forms an angle of 57° with the chord line of the wing. Vector 124 can be resolved into the longitudinal and normal thrust components, 124' and 124'', respectively. When the flaps 34' are set to an angle of 80° as shown in FIG. 5C, the thrust vector is diverted through an additional 19° to an angle of 76°, indicated by thrust vector 130. Separating vector 130 into its components yields the longitudinal and normal thrust components 130' and 130'', respectively.

As can be seen, a change in flap setting from 60° to 80° will result in a corresponding alteration of the turning angle of the exhaust stream and consequently of the direction of the thrust vector. Comparison of the thrust vectors 124 and 130 shows that a change in the length of the longitudinal thrust vector ($\Delta x$) and an accompanying change in the normal thrust vector ($\Delta y$); however, the change in magnitude of the longitudinal vector ($\Delta x$) greatly exceeds the change in magnitude of the normal thrust vector ($\Delta y$). By so varying the flap settings, a significant alteration of longitudinal thrust can be accomplished without causing a substantial change in augmented lift. The net effect on the aircraft of the present invention is substantially the same as derived from a change in engine power setting on conventional aircraft. Thus, control over the glide path and aircraft speed can be readily achieved through rapid variation of the flap settings as provided by the present invention. Controlling the magnitude of the longitudinal thrust component by this means results in a very low response time when contrasted with the prior art wherein longitudinal thrust is controlled through a variation in engine power output.

By way of further explanation of glide path control through rapid variation of flap setting as described above, refer to the graph of FIG. 7. The graph illustrates net percentage changes in the sum of upwardly directed normal forces and the sum of forwardly directed longitudinal forces on the aircraft of the present invention with variations in flap setting and thrust levels. The forces illustrated in the graph are a composite of both longitudinal and normal components of aerodynamic lift, drag and thrust forces on the aircraft. Line 132 of the graph represents a constant engine power or thrust setting while varying the aft flap setting from 60° at point A to 80° at point B. As can be observed, the change in the longitudinal forces from point A to point B is greater than 100% while the change in the normal forces is on the order of less than 5%. By so increasing or decreasing the flap setting angle the glide path of the aircraft can be readily controlled.

The lines 134 and 136 represent force variations resulting from a change in engine power setting at constant flap settings of 80° and 60°, respectively. Line 138 represents a constant thrust level about 50% higher than that indicated by line 132. Line 138 illustrates that the change in longitudinal forces is even greater with respect to the change in normal forces as the flaps are altered from a setting of 80° indicated by point C to a setting of 60° indicated by point D. When thrust is reduced below the level indicated by line 132 to a setting of approximately 50% less as indicated by line 140, the change from a flap setting of 80° at point E to 60° at point F still results in a relatively large change in longitudinal forces as compared to a small change in the normal forces.

Although the present invention has been described in relation to a preferred embodiment that fulfills the several objects and advantages set forth herein, it is understood that one of ordinary skill in the art will be able to effect various changes, substitutions of equivalents and other alterations without departing from the original concept of the invention. For example, the invention claimed herein has been disclosed by relation to a STOL aircraft; however, the principles disclosed and claimed herein are equally applicable to very short or vertical take-off and landing aircraft as well as to conventional aircraft. It is therefore intended that the present invention be limited only by the definition contained in the appended claims.

What is claimed is:
1. A wing, engine and flap combination suitable for use by an aircraft, said combination comprising:
 1. a wing defining an upper airfoil surface;
 2. an engine associated with said wing and suitable for generating a lift enhancing exhaust stream when said exhaust stream is directed downwardly, said engine having an exhaust nozzle from which said exhaust stream exits, said exhaust nozzle mounted in relationship to said wing so as to direct said exhaust stream along a path that extends rear- wardly across the upper airfoil surface defined by said wing;

3. a flap affixed to said wing and located at the aft end thereof, said flap being movable between a retracted position and extended positions so as to extend said upper airfoil surface rearwardly and downwardly when in said extended positions, said flap and said wing so constructed and arranged as to be capable of defining a longitudinal spanwise slot in said upper airfoil surface between said flap and said wing when said flap is in an extended position;

4. flap actuating means associated with said flap for moving said flap between said retracted position and said extended positions;

5. slot closure means associated with said flap and said wing for opening and closing said longitudinal spanwise slot in said upper airfoil surface when said flap is in an extended position, said slot closure means being movable between
   a. a closed position wherein said slot closure means closes said longitudinal spanwise slot in said upper airfoil surface and conjunctively forms with said wing and said flap a smooth upper airfoil surface configured so as to cause attachment of said exhaust stream to said upper airfoil surface and to turn said attached exhaust stream downwardly along said upper airfoil surface to create a longitudinal thrust component and a normal thrust component, and
   b. an open position wherein said slot closure means opens said longitudinal spanwise slot and allows ambient air to pass therethrough.

2. The combination of claim 1 wherein said slot closure means comprises:
   a. a slot closure device associated with said flap and being movable between said closed position and said open position, and
   b. slot closure device actuating means associated with said slot closure device for moving said slot closure device between said open and closed positions.

3. The combination claimed in claim 2, wherein said flap in said extended positions and said slot closure device in said closed position form a smoothly curved upper airfoil surface that extends rearwardly and downwardly from the upper airfoil surface defined by said wing, said smoothly curved upper airfoil surface diverting said exhaust stream through a predetermined angle, said predetermined angle varying in accordance with the extended position of said flap.

4. The combination claimed in claim 3 wherein:
   1. said flap comprises a main section and an aft section, said aft section being located aft of said main section and being movable with respect thereto between an aft retracted position and aft extended positions, said aft section and said main section defining, in said upper airfoil surface, a second longitudinal spanwise slot therebetween, the width of said second longitudinal spanwise slot varying in accordance with the extended position of said aft section, between said aft retracted position and said aft extended positions;
   2. said flap actuating means includes means for moving said aft section between said aft retracted position and said aft extended positions; and,
   3. said slot closure means includes a second slot closure device movable between a closed position wherein said second slot closure device closes said second longitudinal spanwise slot in said upper airfoil surface of maintaining a smooth upper airfoil surface configured so as to cause attachment of said exhaust stream to said upper airfoil surface and turning of said attached exhaust stream downwardly along said upper airfoil surface, and an open position wherein said slot closure device opens said longitudinal spanwise slot and allows ambient air to pass therethrough, and a second slot closure device actuating means associated with said second slot closure device for moving said second slot closure device between said open and said closed positions.

5. The combination claimed in claim 4 wherein the movement of said flap between said plurality of extended positions changes the angle through which said exhaust stream is turned downwardly to thereby alter the magnitude of said longitudinal thrust component and said normal thrust component, said change in magnitude of said normal thrust component being small relative to the change in magnitude of said longitudinal thrust component.

6. The combination claimed in claim 5 including:
   a thrust reverser mounted so as to be movable between a position intersecting said exhaust stream and a position that does not generally intersect said exhaust stream, said thrust reverser when in said position intersecting said exhaust stream acting to divert said exhaust stream upwardly and forwardly with respect to said wing; and,
   thrust reverser actuator means associated with said thrust reverser for moving said thrust reverser between said position intersecting said exhaust stream and said position that does not generally intersect said exhaust stream.

7. The combination claimed in claim 6, wherein said wing defines a chordline and wherein said aft section of said flap defines a second chordline which intersects said first chordline, the angle between said first and second chordlines being at least sixty degrees when said flap and said aft section are extended.

8. The combination claimed in claim 7, wherein the angle between said first and second chordlines being at least eighty degrees when said flap and said aft section are fully extended.

9. The combination claimed in claim 8, wherein the average radius of curvature of said curved upper airfoil surface of said flap when in said extended positions is at least two times the average thickness of said exhaust stream turning downwardly along said curved upper airfoil surface.

10. The combination claimed in claim 2, wherein:
    1. said flap comprises a main section and an aft section, said aft section being located aft of said main section and being movable with respect thereto between an aft retracted position and aft extended positions, said aft section and said main section defining, in said upper airfoil surface, a second longitudinal spanwise slot therebetween, the width of said second longitudinal spanwise slot varying in accordance with the extended position of said aft section, between said aft retracted position and said aft extended positions;
    2. said flap actuating means includes means for moving said aft section between said aft retracted position and said aft extended positions; and, 3. said slot closure means includes a second slot closure device movable between a closed position wherein said second slot closure device closes said second longitudinal spanwise slot in said upper airfoil surface for maintaining a smooth upper airfoil surface configured so as to cause attachment of said exhaust stream to said upper airfoil surface and turning of said attached exhaust stream downwardly along said upper airfoil surface, and an open position wherein said slot closure device opens said longitudinal spanwise slot and allows ambient air to pass therethrough, and a second slot closure device actuating means associated with said second slot closure device for moving said second slot closure device between said open and said closed positions.

11. The combination claimed in claim 10, wherein said wing defines a chordline and wherein said aft section of said flap defines a second chordline which intersects said first chordline, the angle between said first and second chordlines being at least sixty degrees when said flap and said aft section are extended.

12. The combination claimed in claim 1, wherein the average radius of curvature of said curved upper airfoil surface of said flap when in said extended positions is at least two times the average thickness of said exhaust stream turning downwardly along said curved upper airfoil surface.

13. The combination of claim 1 wherein said flap and said wing define a longitudinal spanwise slot in said wing as said flap is moved to an extended position.

14. The combination of claim 1 wherein the width of said slot is varied in accordance with the extended position of said flap.

15. A method of controlling the drag and lift components acting on an aircraft in which an exhaust stream from an engine is directed over an upper airfoil surface of a wing and trailing edge flap located on the aft end of said wing and selectively extendable from a retracted cruise position to a plurality of extended positions such that the angle the chordline defined by said flap makes with the chordline defined by said wing can be varied, said trailing edge flap having an upper curved surface so configured and arranged as to form, when extended, a surface to which said exhaust stream can adhere and turn downwardly and rearwardly to create both longitudinal and normal thrust components, said method comprising the steps of:

extending said trailing edge flap; and, selectively controlling both the opening and closing of a slot formed between said wing and said flap when said flap is extended, so that a smooth continuous curved surface that extends downwardly and rearwardly from said upper airfoil surface of said wing to which said exhaust stream can adhere to and turn about is formed when said slot is closed, said smooth continuous curved surface becoming discontinuous when said slot is opened to allow ambient air to flow between said wing and said flap.

16. The method claimed in claim 15 wherein said slot is opened when said engine of said aircraft fails to create an exhaust stream adequate to create said longitudinal and normal thrust components.

17. The method claimed in claim 16, wherein said smooth continuous curved surface has an average radius of curvature at least two times the thickness of said exhaust stream turning thereover.

18. A method of controlling the drag and lift components acting on an aircraft in which an exhaust stream from an engine is directed over an upper airfoil surface of a wing and trailing edge flap located on the aft end of said wing and selectively extendable from a retracted cruise position to a plurality of extended positions such that the angle the chordline defined by said flap makes with the chordline definded by said wing can be varied, said trailing edge flap having an upper curved surface so configured and arranged as to form, when extended, a surface to which said exhaust stream can adhere and turn downwardly and rearwardly to create both longitudinal and normal thrust components, said method comprising the steps of:

extending said trailing edge flap;

selectively controlling both the opening and closing of a slot formed between said wing and said flap when said flap is extended, so that a smooth continuous curved surface that extends downwardly and rearwardly from said upper airfoil surface of said wing to which said exhaust stream can adhere to and turn about is formed when said slot is closed, said smooth continuous curved surface becoming discontinuous when said slot is opened to allow ambient air to flow between said wing and said flap; and selectively varying the arc length of said smooth continuous curved surface to vary the angle formed between the chord defined by said trailing edge flap and the chord defined by said wing to thereby vary the magnitude of said longitudinal and normal thrust components.

* * * * *